United States Patent Office 2,959,578
Patented Nov. 8, 1960

2,959,578

PROCESS AND CATALYST FOR OLEFIN POLYMERIZATION

John Paul Hogan, Bartlesville, Okla., assignor to Phillips Petroleum Company, a corporation of Delaware No Drawing. Filed Apr. 7, 1958, Ser. No. 726,619

7 Claims. (Cl. 260—94.9)

This invention relates to the polymerization of olefins to form solid polymer. In one aspect it relates to a novel catalyst.

U.S. Patent 2,825,721, issued March 4, 1958, to Hogan and Banks, discloses the conversion of olefins to normally solid polymers in the presence of a catalyst comprising chromium oxide supported on certain oxide carriers, at least part of the chromium being in the hexavalent state.

According to the present invention, an aliphatic 1-olefin having from 2 to 8 carbon atoms per molecule and no chain branching nearer the double bond than the 4-position is polymerized to form solid polymer in the presence of a catalyst comprising chromium oxide supported on an oxide of germanium, at least part of the chromium being in the hexavalent state.

The germanium oxide utilized as a support material according to the present invention can be any oxide of germanium, but is ordinarily germanium dioxide, represented by the formula $GeO_2$. This oxide is preferably used in the form of a marcroporous gel, such as can be obtained by the hydrolysis of germanium tetrachloride followed by heating at an elevated temperature to remove water. The preparation of such gels is known in the art. The germanium oxide utilized as a support can contain such other oxides as alumina, silica, titanium, zirconia, and the like. However, the germanium oxide is the principal or major component of the carrier and of the catalyst, and the chromium oxide is generally a minor constituent of the catalyst.

The chromium oxide content of the final catalyst is ordinarily such that the chromium content is within the range 0.5 to 10 weight percent. However, the chromium content can range as high as 30 or even 50 weight percent. The composition of the catalyst generally is expressed so that the chromium is given in terms of elemental chromium. However, it should be clear to those skilled in the art that the chromium is actually present in the form of oxide. The nonchromium components of the catalyst are expressed in their true form, i.e. oxides, which can be hydrated.

The catalyst according to this invention can be prepared by depositing a chromium compound which is ignitable to the oxide on the surface of the germanium oxide. Suitable chromium compounds are chromium trioxide and chromic nitrate. The chromium compound can be deposited on the germanium oxide by grinding the oxides together, e.g. in a ball mill, or by spraying an aqueous solution of the chromium compound onto the surface of the germanium oxide. The resulting composite is dried, when necessary, and is subsequently activated by heating at an elevated temperature. The activation is ordinarily conducted with the catalyst composite in a nonreducing atmosphere. Suitable atmospheres for this purpose are nitrogen, oxygen, and air. It is preferred that the activation atmosphere be substantially anhydrous, i.e. that it have a dew point below about 0° F. It is further preferred that the activation atmosphere contain free oxygen. Air is generally the preferred activation atmosphere. The activation heating can be omitted if desired. However, it is much to be preferred that the high temperature activation be utilized. Although reducing gases such as hydrogen and carbon monoxide can be present during the activation, it is much preferred that they be absent. If the reducing gases mentioned are present, their time of contact with the catalyst or their concentration in the activating atmosphere should be held sufficiently low that the hexavalent chromium content of the catalyst is not completely destroyed. The activation is generally carried out at a temperature in the range 500 to 1500° F., and frequently in the range 750 to 1300° F. The time required for the activaion is ordinarily with the range 1 to 20 hours. The activated catalyst, if not used immediately, should be stored in a container from which moisture and reducing gases are excluded.

The foregoing activation should be conducted so that the final catalyst contains at least 0.1 percent hexavalent chromium, based on total catalyst weight. Preferably, the hexavalent chromium content is at least 0.5 weight percent.

Suitable feed olefins for polymerization according to the present invention include ethylene, propylene, 1-butene, 1-pentene, 1-hexene, and 4-methyl-1-pentene.

The polymerization can be conducted with the olefin in the liquid or in the gaseous phase. It is often preferred that the monomeric olefin be utilized in admixture with an inert diluent. The diluent should, of course, be free of materials, such as water, sulfur compounds, and the like, which poison the catalyst. Suitable diluents which are preferred are the paraffinic and the cycloparaffinic hydrocarbons. Suitable hydrocarbons of this class are propane, isobutane, normal butane, isopentane, normal pentane, the isohexanes, normal hexane, cyclopentane, methylcyclopentane, cyclohexane, methylcyclohexane, and the dimethylcyclohexanes. Aromatic hydrocarbons, such as benzene, toluene and the xylenes can be utilized, but are ordinarily not preferred, since they, or impurities therein, appear to reduce the yields of polymer obtainable below those which would otherwise be realized. The over-all concentration of olefin in the hydrocarbon feed to the reactor when a diluent is used can be within the range 1 to 20 weight percent, based on total hydrocarbon, although these limits are not absolute. The feed and withdrawal rates are preferably regulated so that the polymer concentration in the reaction zone is within the range 1 to 20 weight percent. Any of the catalytic contacting techniques utilized in the prior art can be utilized in accordance with this invention. Numerous suitable techniques are explained in detail in the cited U.S. Patent 2,825,721 (1958). Thus the catalyst can be utilized in the form of a fixed bed, a fluidized dense bed, or a slurry in the diluent. When the catalyst is utilized in the form of a slurry, the concentration of catalyst in said slurry is ordinarily within the range 0.01 to 10 weight percent. The particle size of the catalyst in this slurry can suitably be within the range from about 20 mesh down to a few microns. When the slurry technique is used, a slurry of the catalyst in the diluent, e.g. cyclohexane, is continually passed to the reactor, as is a stream of the olefin to be polymerized. The reaction mixture within the reactor can be stirred mechanically or pneumatically.

Suitable reaction conditions according to the present invention include a temperature in the range 100 to 500° F., preferably 150 to 350° F., and more preferably 200 to 300° F.; a pressure from atmospheric to 1000 pounds per square inch; and a residence time in the reactor in the range from about 15 minutes to about 6 hours when the described slurry technique is used. When the catalyst is utilized in the form of a fixed bed a suitable liquid hourly space velocity is within the range 0.5 to 20. When a diluent is utilized, the pressure is generally sufficient to maintain said diluent substantially in the liquid phase. Pressures generally in excess of this amount can be used, but are not necessary.

In order to recover the product polymer from the reactor effluent, the unreacted olefin can be removed by flashing or venting. The unvaporized material can then be heated to dissolve the polymer in the diluent, and the catalyst can be removed by filtration. Optionally, the filtration of the catalyst can be omitted. The product polymer can be recovered from admixture with the diluent by vaporizing the diluent or by cooling the mixture to cause complete precipitation of the polymer. Alternatively, a combination of these two methods can be utilized.

The products of this invention are normally solid thermoplastic polymers which can be molded to form articles of any desirable shape, e.g. containers for liquids and machine parts such as gears. Furthermore, the polymers can be fabricated in the form of films for packaging or filaments for the manufacture of fabrics, rope and the like. The product polymers are generally useful where polyethylenes and polypropylenes known in the prior art are useful.

*Example I*

Fifty grams of germanium dioxide powder was placed in a ball mill together with 1 gram of solid chromium trioxide and 39 milliliters of water. The resulting mixture was ball milled for 2 hours. The resulting slurry was then dried to form a solid cake, and the cake was crushed and screened to obtain a product having a maximum particle size from 30 to 50 mesh. The resulting composite was heated at 1000° F. in a stream of air (dew point below 0° F.) for five hours. The hexavalent chromium content of the resulting catalyst was approximately 1/10 weight percent. A slurry of 6.57 grams of the catalyst prepared as described was prepared by mixing the catalyst with 300 grams of cyclohexane in a 1-liter reactor provided with a mechanical stirrer. The reactor was tightly closed, and chemically pure ethylene was continuously supplied to the reactor at a sufficient rate to maintain the total pressure substantially constant at 452 p.s.i.g. The reactor was heated to and maintained at 283° F. for the duration of the run which was 1½ hours. Air and moisture were excluded from the reactor throughout the described operation. At the end of this time, the reactor was cooled to room temperature, the unreacted ethylene was vented, and the reactor was opened. The mixture removed from the reactor was subjected to flashing to vaporize the cyclohexane and the remaining catalyst plus polymer (14.9 grams) was dried overnight in an oven. The yield of polymer was 1.27 grams per gram of catalyst. The polymer was a normally solid thermoplastic polyethylene.

*Example II*

The procedure described in Example I is repeated except that propylene is substituted for ethylene and the temperature is maintained at 200° F. The pressure during this run is approximately 120 p.s.i.g. A solid polypropylene is obtained.

Variations and modifications within the scope of the foregoing specification and the claims can be practiced without deviation from the scope of the present invention. Thus it will be clear to those skilled in the art that the various monomers mentioned can be copolymerized with each other. Thus, for example, by supplying both propylene and ethylene to the polymerization reaction zone, a copolymer of ethylene can be obtained.

I claim:
1. A process which comprises polymerizing, at a polymerization temperature in the range 100 to 500° F., an aliphatic 1-olefin having from 2 to 8 carbon atoms per molecule and no chain branching nearer the double bond than the 4-position, in the presence of a catalyst comprising chromium oxide, in which at least part of the chromium is hexavalent, supported on a carrier comprising an oxide of germanium as its major component.

2. A process which comprises polymerizing, at a polymerization temperature in the range 150 to 350° F., and in the presence of an inert hydrocarbon diluent, an aliphatic 1-olefin having from 2 to 8 carbon atoms per molecule and no chain branching nearer the double bond than the 4-position, in the presence of a catalyst comprising chromium oxide supported on a carrier comprising an oxide of germanium as its major component, at least 0.1 weight percent of the total catalyst being chromium in the hexavalent state, maintaining a polymerization pressure sufficient to maintain said diluent substantially in the liquid phase, and recovering a resulting normally solid polymer.

3. A process which comprises polymerizing ethylene, in the presence of an inert saturated hydrocarbon diluent, at a polymerization temperature in the range 150 to 350° F., in the presence of a catalyst consisting essentially of chromium oxide supported upon germanium oxide, the hexavalent chromium content of said catalyst being at least 0.1 weight percent, maintaining a pressure during said polymerization which is sufficient to maintain said diluent substantially in the liquid phase, and recovering a solid polyethylene.

4. A process which comprises polymerizing ethylene, in the presence of an inert saturated hydrocarbon diluent, at a polymerization temperature in the range 150 to 350° F., in the presence of a catalyst consisting essentially of chromium oxide supported on a carrier comprising germanium dioxide as its major component, the total chromium content of said catalyst being within the range 0.5 to 10 weight percent, the hexavalent chromium content of said catalyst being at least 0.1 weight percent, maintaining pressure during said polymerization sufficient to maintain said diluent substantially in the liquid phase, and recovering a resulting normally solid polyethylene.

5. A process which comprises polymerizing ethylene, in admixture with cyclohexane as a diluent, at a polymerization temperature in the range of 200 to 300° F. in the presence of a catalyst consisting essentially of chromium oxide supported on a carrier comprising germanium dioxide as its major component, the total chromium content of said catalyst being in the range 0.5 to 10 weight percent, the hexavalent chromium content of said catalyst being at least 0.5 weight percent, maintaining the pressure during said polymerization sufficient to maintain said cyclohexane in the liquid phase, and recovering a resulting normally solid polyethylene.

6. A catalyst comprising chromium oxide supported on a germanium oxide, at least part of the chromium in said catalyst being in the hexavalent state.

7. A catalyst consisting essentially of chromium oxide supported on a carrier comprising germanium dioxide as its major component, the total chromium content of said catalyst being in the range 0.5 to 10 weight percent, and the hexavalent chromium content of said catalyst being at least 0.1 weight percent.

References Cited in the file of this patent
UNITED STATES PATENTS 2,423,612   Mulligan _____ July 8, 1947
2,825,721   Hogan et al. _____ Mar. 4, 1958

OTHER REFERENCES

Catalysis (Emmett), Reinhold Publishing Corporation (New York), 1954 (pages 245–272).